US010785337B2

(12) United States Patent
Li

(10) Patent No.: US 10,785,337 B2
(45) Date of Patent: Sep. 22, 2020

(54) ANALYTICS AND DATA VISUALIZATION THROUGH FILE ATTACHMENTS

(71) Applicant: Microsoft Technology Licensing, LLC, Redmond, WA (US)

(72) Inventor: Zuopan Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

(21) Appl. No.: 15/637,963

(22) Filed: Jun. 29, 2017

(65) Prior Publication Data

US 2019/0007512 A1 Jan. 3, 2019

(51) Int. Cl.
*H03K 19/00* (2006.01)
*H03K 4/00* (2006.01)
*H04N 5/64* (2006.01)
*H04L 29/08* (2006.01)
*H04L 12/58* (2006.01)
*G06F 21/55* (2013.01)
*H04L 29/06* (2006.01)
*G06F 1/00* (2006.01)
*G06F 3/0484* (2013.01)
*G06Q 10/10* (2012.01)
*G06F 40/18* (2020.01)
(Continued)

(52) U.S. Cl.
CPC ............ *H04L 67/2823* (2013.01); *G06F 1/00* (2013.01); *G06F 3/04842* (2013.01); *G06F 21/554* (2013.01); *G06Q 10/107* (2013.01); *H04L 51/12* (2013.01); *H04L 63/1408* (2013.01); *G06F 16/9577* (2019.01); *G06F 40/174* (2020.01); *G06F 40/18* (2020.01); *G06F 40/186* (2020.01)

(58) Field of Classification Search
CPC .......................... H04L 67/2823; G06Q 10/107
USPC .......................................................... 715/215
See application file for complete search history.

(56) References Cited

U.S. PATENT DOCUMENTS 7,756,935 B2    7/2010  Gaucas
2005/0289630 A1*  12/2005  Andrews .............. H04N 21/235
                                                              725/116
(Continued)

OTHER PUBLICATIONS

"Do any BI tools let you push data in via email attachments?", https://www.quora.com/Do-any-BI-tools-let-you-push-data-in-via-email-attachments, Retrieved on: Apr. 17, 2017, 2 pages.
(Continued)

*Primary Examiner* — Cesar B Paula
*Assistant Examiner* — Luu-Phuong T Nguyen
(74) *Attorney, Agent, or Firm* — Schwegman Lundberg & Woessner, P.A.

(57) ABSTRACT

Example system and method for providing analytics and data visualization of an attached file in an attachment-enabled application are provided. An analysis system causes presentation of an option to perform analysis on a file attached to main data in an attachment-enabled application. The analysis system receives an indication of a selection of the option to perform the analysis on the attached file, whereby the analysis to be performed without user download of the attached file. The analysis system determines, based on data corresponding to the attached file, one or more data sets on which to perform the analysis and a result type for outputting of a result, and performs analysis on the one or more data sets to generate the result based on the result type. The analysis system causes presentation of the result based on the result type.

17 Claims, 10 Drawing Sheets

(51) Int. Cl.
  *G06F 40/174*    (2020.01)
  *G06F 40/186*    (2020.01)
  *G06F 16/957*    (2019.01)

(56) References Cited

U.S. PATENT DOCUMENTS

| | | | | |
|---|---|---|---|---|
| 2006/0168543 | A1* | 7/2006 | Zaner-Godsey | G06Q 10/107 715/835 |
| 2007/0185970 | A1* | 8/2007 | Arenburg | G06Q 10/107 709/217 |
| 2008/0115049 | A1* | 5/2008 | Tolle | G06F 40/18 715/209 |
| 2009/0319618 | A1* | 12/2009 | Affronti | G06Q 10/107 709/206 |
| 2010/0138212 | A1* | 6/2010 | Wang | G06F 17/2223 704/3 |
| 2011/0271172 | A1* | 11/2011 | Radakovitz | G06F 40/18 715/212 |
| 2012/0259794 | A1 | 10/2012 | Shanahan et al. | |
| 2012/0284639 | A1* | 11/2012 | Yuniardi | G06Q 10/00 715/752 |
| 2014/0046976 | A1* | 2/2014 | Zhang | G06Q 30/0255 707/772 |
| 2014/0068458 | A1* | 3/2014 | Kim | H04L 51/08 715/752 |
| 2014/0184607 | A1* | 7/2014 | Toyoshima | G06T 11/206 345/440 |
| 2015/0081369 | A1* | 3/2015 | Sarrazin | G06Q 10/109 705/7.18 |
| 2015/0100895 | A1* | 4/2015 | Parmar | H04L 51/10 715/752 |
| 2015/0134694 | A1 | 5/2015 | Burke et al. | |
| 2015/0281148 | A1* | 10/2015 | Masterson | H04L 51/08 715/752 |
| 2016/0021181 | A1 | 1/2016 | Ianakiev et al. | |
| 2016/0241499 | A1 | 8/2016 | Hailpern et al. | |
| 2017/0060824 | A1* | 3/2017 | Sunderland | G06F 17/2235 |
| 2017/0097956 | A1* | 4/2017 | Kim | G06F 17/30563 |
| 2017/0142042 | A1* | 5/2017 | Bandi | H04L 51/08 |
| 2019/0012059 | A1* | 1/2019 | Kwon | G06F 3/0488 |

OTHER PUBLICATIONS

"Build a dashboard with Klipfolio using an email attachment", https://www.klipfolio.com/integrations/email-attachment-dashboard, Retrieved on: Apr. 17, 2017, 4 pages.

"Why On-Demand Business Intelligence?", https://www.zoho.com/reports/business-intelligence.html, Retrieved on: Apr. 17, 2017, 7 pages.

Hailpern, et al., "AttachMate: Highlight Extraction from Email Attachments", In Proceedings of the 27th annual ACM symposium on User interface software and technology, Oct. 5, 2014, pp. 107-116.

"Ready to parse your email attachments or convert pdf to Excel?", https://mailparser.io/case-studies/attachment-parsing, Retrieved on: Apr. 17, 2017, 6 pages.

Liu, et al., "TIARA: Interactive, Topic-Based Visual Text Summarization and Analysis", In ACM Transactions on intelligent Systems and Technology (TIST), vol. 3, Issue 2, Feb. 29, 2012, 28 Pages.

"International Search Report and Written Opinion Issued in PCT Application No. PCT/US2018/033999", dated Nov. 12, 2018, 13 Pages.

* cited by examiner

Sat 6/10/2017 6:14 PM
Suzan Smith
Monthly Numbers Report

To John Rathers

Retention Policy Delete all items after 7 years (7 years)     Expires 6/8/2024

Monthly Numbers.docx ▸ ⌐ 300
17 KB

Hi John:

We closed out the books for June. Attached are the numbers for the month.

Best Regards,
Suzan Smith

Sat 6/10/2017 6:14 PM
Suzan Smith
Monthly Numbers Report

To John Rathers

Retention Policy Delete all items after 7 years (7 years)     Expires 6/8/2024

Monthly Numbers.docx ▾  ~300
17 KB

Hi John:

We closed out the books for ⸺ ┌─ 306  
                              Select Data Set  
                              ☑ ≡ ≡ ≡ ≡  
                              ☑ ≡ ≡ ≡ ≡  
                              ☐ ≡ ≡ ≡ ≡  
numbers for the month.

Best Regards,
Suzan Smith

FIG. 3C

ANALYTICS AND DATA VISUALIZATION THROUGH FILE ATTACHMENTS

TECHNICAL FIELD

The subject matter disclosed herein generally relates to machines configured to the technical field of special-purpose machines that facilitate data analysis and visualization, including computerized variants of such special-purpose machines and improvements to such variants, and to the technologies by which such special-purpose machines become improved compared to other special-purpose machines that facilitate data analysis and visualization. Specifically, the present disclosure addresses systems and methods that provides analytics and data visualization of mail and calendar attachments without user download of the attached file.

BACKGROUND

Conventionally, when a user wants to analyze a file attached in an e-mail or a calendar event, a series of operations need to be performed before results are displayed. Typically, the attached file is first downloaded by the user to a client device of the user. Subsequently, a separate analytics application (e.g., different from an e-mail application or a calendar application) is launched. Using the analytics application, the downloaded file may then be analyzed. Thus, the conventional analysis process can be tedious and time consuming especially if the user is unsure what type of analysis should be performed on the file or even whether the file should be analyzed.

BRIEF DESCRIPTION OF THE DRAWINGS

Some embodiments are illustrated by way of example and not limitation in the figures of the accompanying drawings.

FIG. 3A-FIG. 3E illustrate example screen shots showing a flow for providing analytics and data visualization of an e-mail attachment in accordance with an example embodiment.

DETAILED DESCRIPTION

Figure 1:
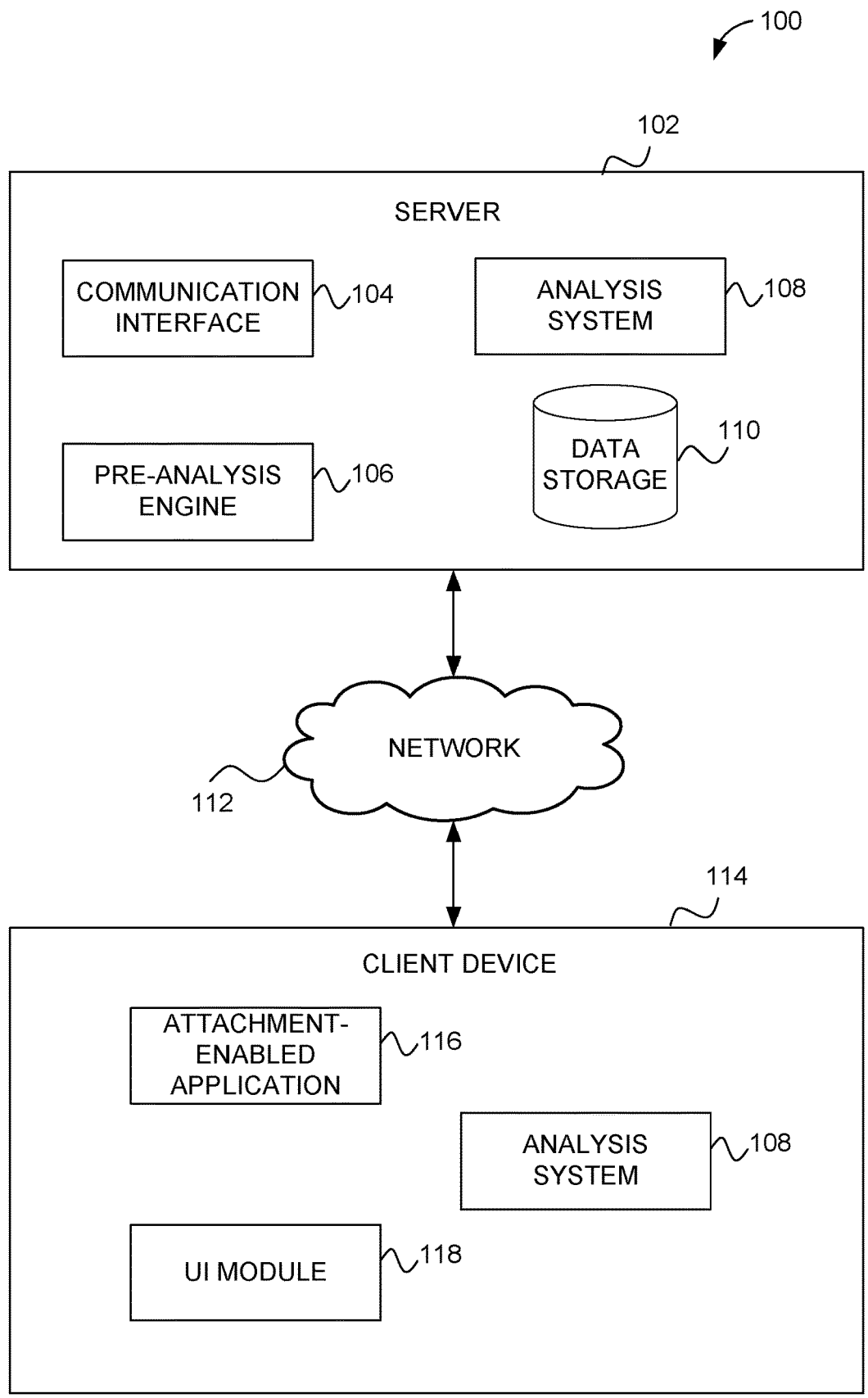
FIG. 1 is a block diagram illustrating an example environment for providing analytics and data visualization of attached files.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) facilitate providing analytics and data visualization through file attachments. In example embodiments, an attachment-enabled application (e.g., e-mail application, calendar application) presents main data (e.g., an e-mail message, calendar event data) along with an indication of an attached filed (e.g., icon that represents the attached file). In some cases, the attached file is attached via a data link (e.g., URL) displayed within the main data. Analysis and data visualization (e.g., presentation of a result) is performed while a user remains (or remains focused) in the attachment-enabled application (e.g., without the user having to leave the attachment-enabled application) and without the user having to explicitly download the attached file to their computer or desktop, or launch a separate analysis application.

In particular, example embodiments provide mechanisms and logic that provides analytics and data visualization through file attachments such as files attached to an e-mail communication or a calendar event. Accordingly, the mechanisms and logic causes presentation of an option to perform analysis on a file attached to main data in an attachment-enabled application. The mechanisms and logic receives an indication of a selection of the option to perform the analysis on the attached file, whereby the analysis to be performed while a user remains focused in the attachment-enabled application and without user download of the attached file. The mechanisms and logic determines, based on data corresponding to the attached file, one or more data sets on which to perform the analysis and a result type for outputting of a result, and performs analysis on the one or more data sets to generate the result based on the determined result type. The result of the analysis is then presented based on the determined result type. The mechanisms and logic may be embodied with a server, a client device, or a combination of both.

As a result, one or more of the methodologies described herein facilitate solving the technical problem of analyzing data within an attached file in a quick and efficient manner. As such, one or more of the methodologies described herein may obviate a need for certain efforts or resources that otherwise would be involved in performing numerous actions in order to perform analysis on attached files such as user downloading of the entire content of the attached file to their desktop, launching a separate analytics application, and triggering analysis of the downloaded file using the separate analytics application. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a block diagram illustrating an example environment 100 for providing analytics and data visualization of file attachments that are attached to main data in an attachment-enabled application (e.g., e-mail application, calendar application). In example embodiments, a server 102 is configured to quickly and efficiently analyze and present visualizations of data within an attached file. In example embodiments, the analysis and presentation of visualizations occur without the user having to leave the attachment-enabled application and without the user having to explicitly download the attached file to their desktop. To enable these operations, the server 102 comprises a communication interface 104, a pre-analysis engine 106, an analysis system 108, and a data storage 110 all of which are communicatively coupled. In example embodiments, the server 102 is an e-mail server or a calendar service server (or both).

The communication interface 104 manages receiving and transmitting communications at the server 102. The communications may include, for example, a trigger to perform analysis, a request for main data (e.g., e-mail communication or calendar entry) along with any attached files, a transmission of pre-analyzed data for the attached file, and instructions for generating user interfaces. In embodiments where the server 102 is an e-mail server, the communication interface 104 provides access to e.g., sends, transmits) e-mail communications. Similarly for embodiments where the server 102 is a calendar service server, the communication interface 104 provides access to (e.g., sends, transmits) calendar entries (e.g., scheduled appointment) and corresponding information (e.g., day, time, persons involved, contact information, dial-in information, location). In some embodiments, the communication interface 104 generates and transmits instructions to client devices for rendering and display of various user interfaces. In other embodiments, the communication interface 104 may generate and present the user interfaces (e.g., on a website).

The pre-analysis engine 106 manages pre-analysis or pre-calculations of data in a file that is attached to the main data (or main document). In some cases, the main data is an e-mail communication. In other instances, the main data may be a calendar entry. The attached file may comprise, for example, a document that is sent as part of the e-mail communication or a calendar invite (e.g., for scheduling a meeting). Each e-mail communication or calendar entry along with any attached files (or copies thereof) are stored to the data storage 110. In example embodiments, the pre-analysis engine 106 detects that the main data has an attached file, and in some embodiments, determines that analysis is likely to occur (e.g., based on a user or recipient of the main data being a subscriber of an analysis service associated with the analysis system 108; based on user preferences or default settings; based on a file type of the attached file). In these embodiments, the pre-analysis engine 106 performs pre-analysis (or pre-calculations) on data from the attached file and stores the pre-analyzed data in the data storage 110. In example embodiments, the pre-analysis may comprise performing calculations such as, for example, calculating a summation value, an average value, a median value, a minimum value, a maximum value, a percentile, a mode, a range, a variance, a standard deviation, or a skewness.

The data storage 110 may also store user profiles or accounts that contain user preferences including user (default) settings established for analysis of attached files. The user default settings may indicate, for example, conditions in which to perform pre-analysis on a file (e.g., a specific file type; files from particular individuals, entities, department, group, or company), particular data sets on which to perform analysis on and a corresponding result type (e.g., based on a particular file type; based on who the file is from sub- scription information (e.g., user subscribed to service that provides the analysis system 108; pay-as-you-go for ser- vice). While the data storage 110 is shown to be a part of the server 102, in some embodiments, the data storage 110 may be located elsewhere in the environment 100 and be communicatively coupled to the server 102. Additionally, any number of data storage 110 may be used to store various types of data.

The analysis system 108 is configured to manage analysis of the attached file and visualization of results from within the attachment-enabled application and without a user having to explicitly download the file or launch a separate analysis application. The analysis system 108 will be discussed in more detail in connection with FIG. 2.

The server 102 is coupled via a network 112 to a client device 114. One or more portions of the network 112 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The client device 114 is a device of the user, which is used to receive data (e.g., receive an e-mail communication) and display information (e.g., via user interfaces). The client device 114 may comprise, but is not limited to, a smartphone, tablet, laptop, multi-processor system, microprocessor-based or programmable consumer electronics, game console, set-top box, or any other device that a user utilizes to communicate over the network 112. In example embodiments, the client device 114 comprises an attachment-enabled application 116. The attachment-enabled application 116 may comprise, for example, an e-mail application or a calendar service application.

Activation of the attachment-enabled application 116 causes the client device 114 to display information (e.g., in the form of user interfaces) associated with the attachment-enabled application 116. Accordingly, the client device 112 comprises a user interface (UI) module 118 that presents user interfaces that allow a user to view information (e.g., e-mail communications, calendar entries), trigger an analysis process to be performed, indicate aspects/parameters to be used in the analysis process, and present results. In some embodiments, the client device 114 makes service calls to the server 102 to cause the presentation of the user interfaces (e.g., obtain the data to display the user interfaces).

In some embodiments, the client device 114 comprises the analysis system 108. In other embodiments, the analysis system 108 may only be embodied within the server 102, only embodied within the client device 114, or the functionalities of the analysis system 108 may be embodied in both, or divided between, the server 102 and the client device 114.

In example embodiments, any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client devices 114 may be embodied within the environment 100. Furthermore, some components or functions of the environment 100 may be combined or located elsewhere in the environment 100. For example, some of the functions of the server 102 may be embodied within the client device 114 or vice-versa. While only a single server 102 is shown, alternative embodiments may contemplate having more than one server to perform server operations discussed herein.

Figure 2:
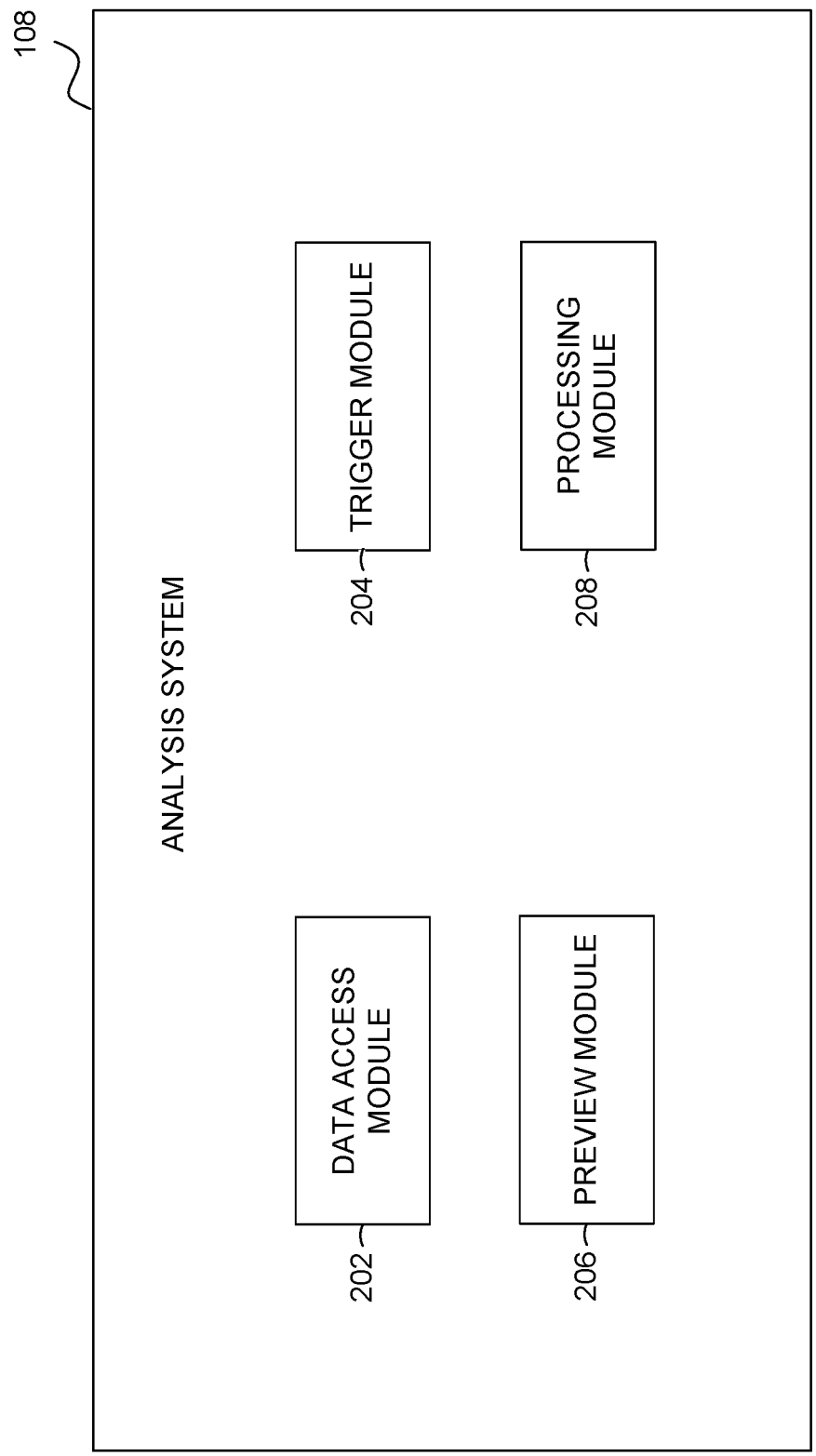
FIG. 2 is a block diagram illustrating components within an analysis system in accordance with an example embodiment.

FIG. 2 is a block diagram illustrating an example embodiment of components within the analysis system 108 in accordance with an example embodiment. In example embodiments, the analysis system 108 performs operations to analyze data from an attached file while a user remains focused in the attachment-enabled application 116 and to provide a visualization of a result without requiring user download of the attached file to their desktop or launch of a separate analysis application. To enable these operations, the analysis system 108 comprises a data access module 202, trigger module 204, a preview module 206, and a processing module 208 all of which are configured to communicate with each other (e.g., over a bus, shared memory, or a switch). As previously noted, the analysis system 108 (or different components of the analysis system 108) may be located at the server 102, client device 114, or both. In some embodiments, the analysis system 108 is a part of the attachment-enabled application 116.

In example embodiments, the data access module 202 is configured to determine whether an attached file can be analyzed and in some cases, access data corresponding to the attached file while a user is viewing the main data. In some embodiments, the data comprises pre-analyzed data (e.g., from the data storage 110) that was pre-analyzed by the pre-analysis engine 106 in anticipation of the analysis process being performed by the analysis system 108.

More particularly, the data access module 202 receives an indication that the user may be interested in analyzing a file attached to the main data that is being accessed (e.g., displayed) on the client device 114. For example, the main data may comprise an e-mail communication or a calendar entry. While viewing the main data in the attachment-enabled application 116 (e.g., the e-mail communication in an e-mail application), the user may hover (e.g., mouse-over) or right click on an icon or link representing the attached file. In some embodiments, in response to the hover or right click, the data access module 202 accesses the data corresponding to the attached file and determines whether the attached file can be analyzed (e.g., filters out attached files that cannot be analyzed). For example, if the attached file is an image file (e.g. a .gif file), zip file, or other file that is not recognized by the data access module 202, the files may not be processed since the data contained therein may not be conducive to analysis. Instead, files that contain data that is delimited (e.g., using commas, tabs, returns) or files of particular types known to contain analyzable data (e.g., .csv files, Excel files) are identified by the data access module 202. In some cases, the attached file, itself, may contain an explicit indication that analysis can be, or should be, performed on it (e.g., an indication provided in a header or first line of the attached file). In an alternative embodiment, user default settings may indicate whether certain types of files (e.g., .csv files) or files from certain entities should be analyzed. For these analyzable files, a menu presented in response to the hover or right click will include an analysis option. The determination whether the attached file can be analyzed may be performed by the data access module 202 after the user hovers or right clicks on the icon or link representing the attached file. Therefore, if the user does not show any interest in the attached file (e.g., does not hover or right click on the attached file), no determination is required and processing power may be conserved.

In example embodiments, the trigger module 204 is configured to monitor for selection of the analysis option and to activate an analysis process of the analysis system 108. If the user selects to perform analysis on the attached file, an indication (e.g., signal generated by selection of the analysis option) is received by the trigger module 204. Upon receiving the indication, the trigger module 204 triggers one or more of the other components of the analysis system 108 to perform their respective functions.

The preview module 206 is configured to determine data sets that can be used for the analysis and applicable result types for output of the result (e.g., visualizations). The data accessed by the data access module 202 from the attached files may contain headers, columns, and rows of data. The preview module 206 organizes the accessed data into sample data sets based on the headers, columns, and rows, and generates a user interface (UI) element that is presented by the user interface module 118 of the client device 114. The UI element comprises a preview of sample data sets that may be analyzed along with selectable components (e.g., checkboxes) that allow the user to select one or more data sets to be analyzed.

Based on the selected one or more data sets, the preview module 206 identifies a plurality of result types that are applicable to the selected one or more data sets. The plurality of result types comprises different plots/graphs or basic calculations. For example, if only a single data set is selected for analysis, the preview module 206 may determine that the result types available include basic calculations such as, for example, a summation, an average, a median, a minimum, or a maximum. In contrast, if two data sets are selected for analysis, the preview module 206 may determine that plots/ graphs (e.g., bar graph, line graph, pie chart, scatter graph) or other types of two-dimensional data displays are available as result types. For a selection of three data sets, the preview module 206 may determine that a combination of basic calculations and plots/graphs are available as result types (e.g., graph of summation or average values).

Based on the identification of the applicable result types, the preview module 206 generates a second user interface (UI) element that is presented by the user interface module 118 of the client device 114. The second UI element comprises previews of the different result types available based on the selected one or more data sets. Each of the previews of the different result types is selectable by the user. The preview module 206 then receives a selection of the result type, via the second UI element, and provides the parameters (e.g., the selected data set(s) and the select result type) to the processing module 208.

In some embodiments, the preview module 206 (e.g., via the data access module 202) accesses user default settings established by the user for the analysis of attached files in the attachment-enabled application. The preview module 206 then determines whether the user default settings are applicable to the current attached file. If the user default settings are applicable, then the preview module 206 provides default data set selections and/or result type selection to the processing module 208. For example, the user default settings may indicate that .cvs files from a particular department should be analyzed, that the analysis should be performed on a first and third data set from the .cvs file, and that the result type should be a bar graph. Therefore, if the current attached file is a .cvs file from the indicated department, then the preview module 206 does not need to provide the first and second UI elements, but instead, provide instructions to the processing module 208 to perform the analysis using the first and third data set and output the result as a bar graph. In these embodiments, the user only needs to select the analysis option, and the result will be presented. Alternatively, the user default settings may just indicate the selected data sets or the selected result type. In these cases, only one of the user interface elements (e.g., for the parameter that is not indicated in the default settings) may be displayed to the user.

The processing module 208 is configured to perform the analysis on the selected data sets and to generate the result (e.g., a visualization) that is displayed on the client device 114 (e.g., via the UI module 118). Based on the selected data sets) and the result type, the processing module may perform calculations (e.g., summation, average, median, maximum, and minimum) or generate graphs (e.g., plots or charts). The result (e.g., visualization) is then provided to the UI module 118 for display on the client device 114.

In example embodiments, the processing module 208 and/or the preview module 206 instructs the UI module 118 to include a back option when presenting the result or a UI element, respectively. The back option allows the user to return to a previous UI element in order to indicate a different selection of one or more data sets or a different selection of a result type, the different selection causing the analysis to be re-performed by the processing module 208.

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The server system 102 may comprise other components not pertinent to example embodiments that are not shown or discussed.

Figure 3A:
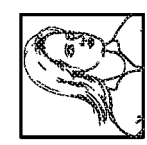

FIG. 3A-FIG. 3E illustrate example screen shots showing a flow for providing analytics and data visualization of an e-mail attachment in accordance with an example embodiment. The UIs are rendered and displayed on the client device (e.g., via the UI module 118) while the user remains in the attachment-enabled application 116. FIG. 3A illustrates a screen shot of an e-mail communication. The e-mail communication includes an attached file 300. While the screen shot shows the attached file 300 being included as an attachment in the e-mail communication, alternative embodiments may indicate the attached file via a link (e.g., URL) provided within a main data portion of the e-mail communication.

Figure 3B:
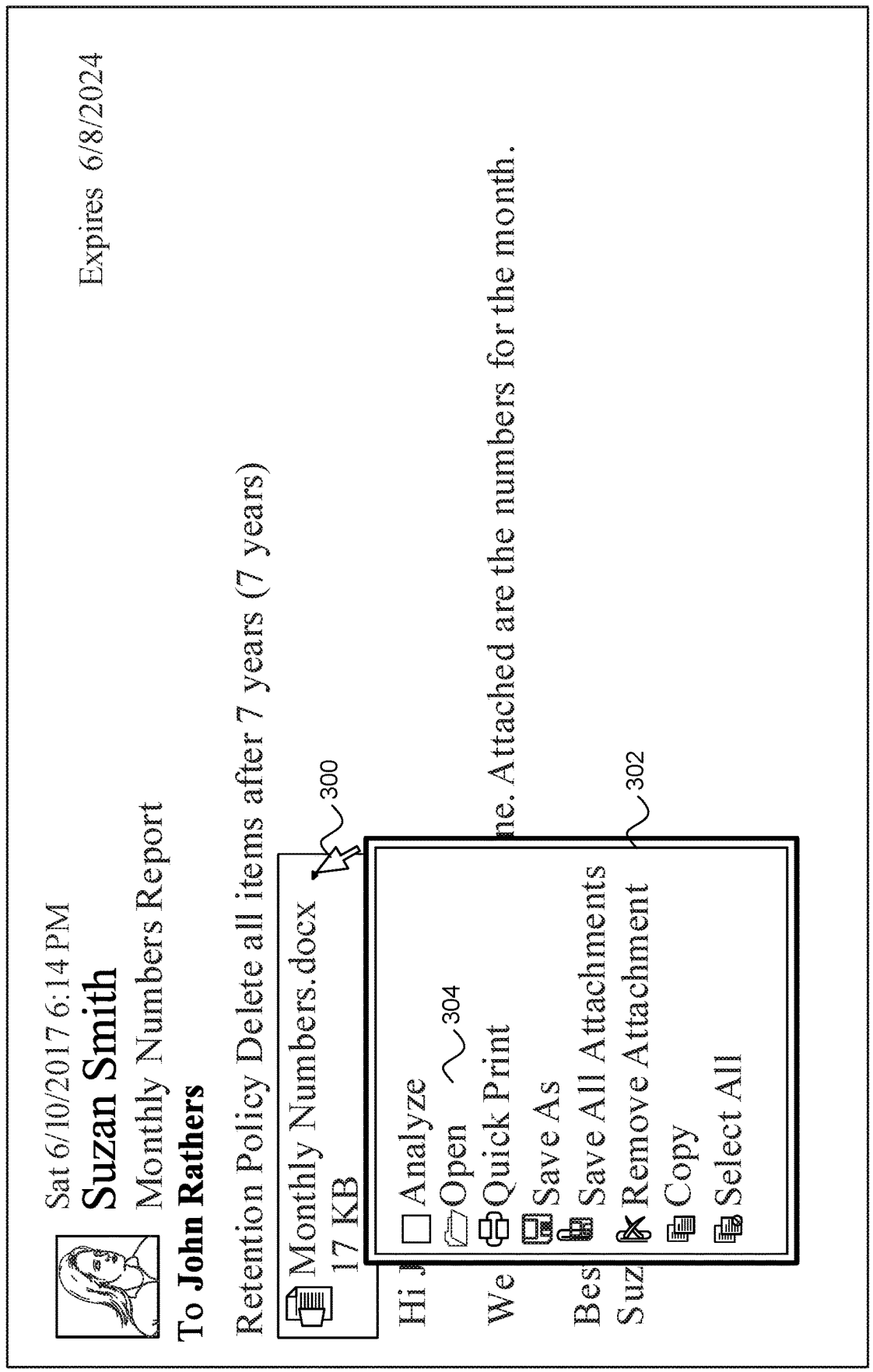

When the user hovers or right clicks on the attached file 300, a menu of options 302 applicable to the attached file 300 is presented as shown in FIG. 3B. The menu of options 302 comprises a popover displayed over a portion of the main data portion. Options in the menu 302 may include, for example, opening the attached file 300, printing the attached file 300, saving the attached file 300, removing the attached file 300, copying the attached file 300, and analyzing the attached file 300 (shown as an analyze option 304).

In response to a selection of the analyze option 304 (e.g., clicking on the analyze option 304), a user interface (UI) element 306 is shown relative to the attached file 300 as illustrated in FIG. 3C. The UI element 306 presents sample data sets from the attached file 300 (e.g., shown as columns of data) along with selectable components (e.g., checkboxes) that allow for selection of one or more data sets for analysis.

Figure 3D:
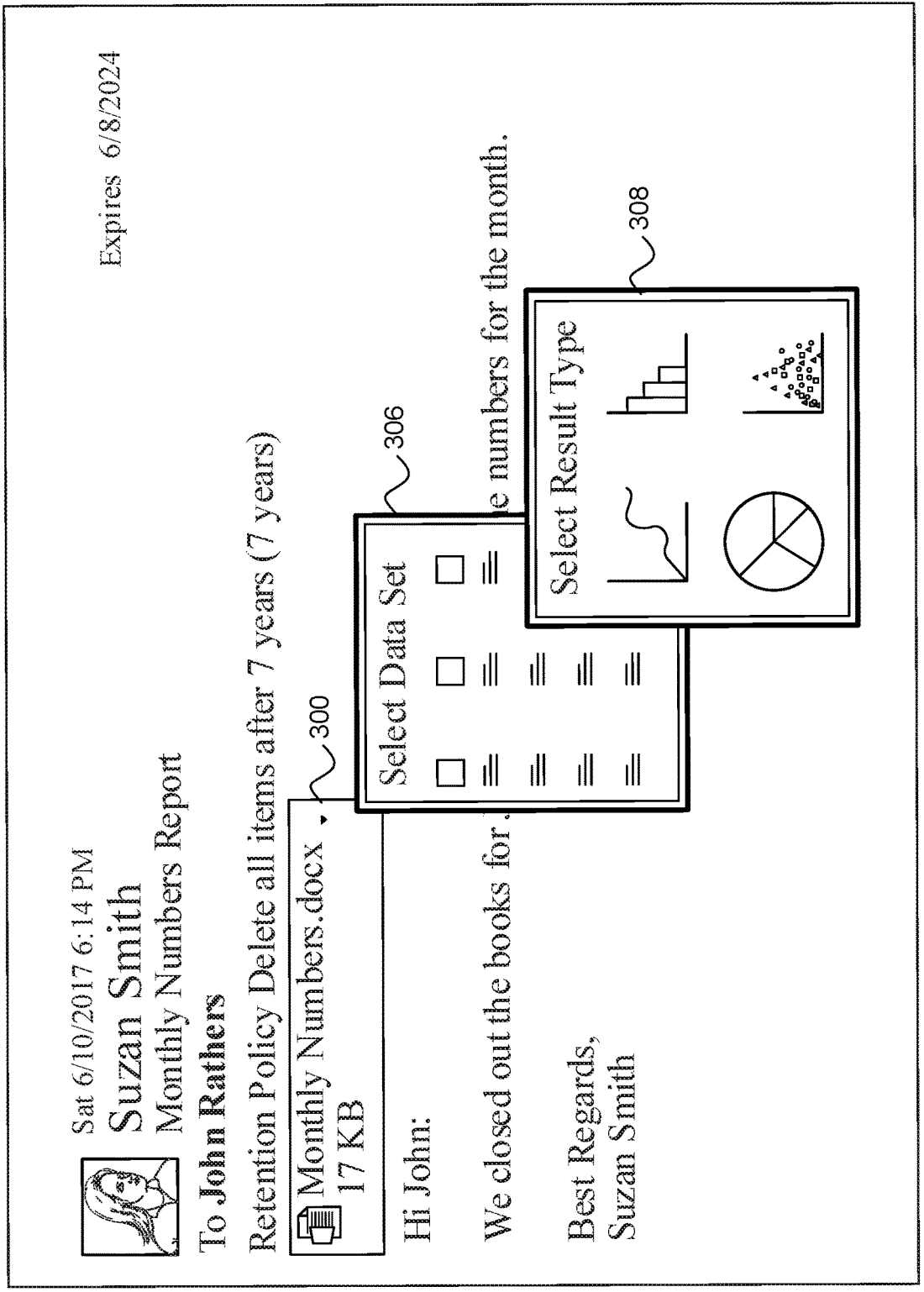

In response to a selection of one or more data sets, a UI element 308 is presented. The UI element 308 presents applicable results types that can be outputted based on the selected one or more data sets as shown in FIG. 3D. Each of the illustrated results types in the UI element 308 is selectable. As shown, the UI element 308 is displayed relative to the UI element 306. In alternative embodiments, the UI element 306 is replaced by the UI element 308.

Figure 3E:
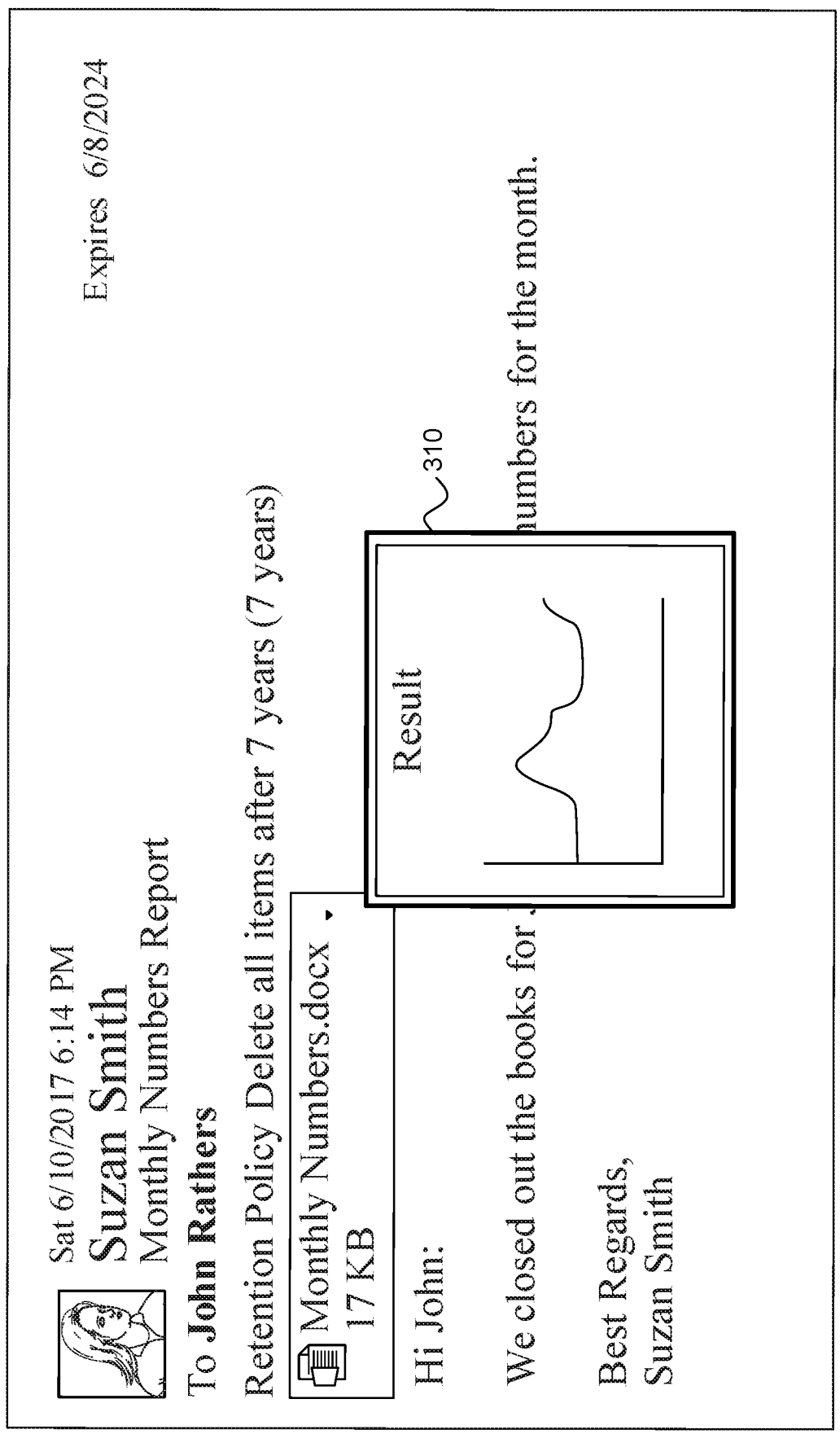

In response to a selection of a result type, a result 310 is presented as shown in FIG. 3E. In example embodiments, the result 310 is presented in a UI element that is displayed relative to the attached file 300. In some embodiments, the result 310 may, additionally or alternatively, be exported to a .pdf, a presentation, or other application or document type.

Figure 4:
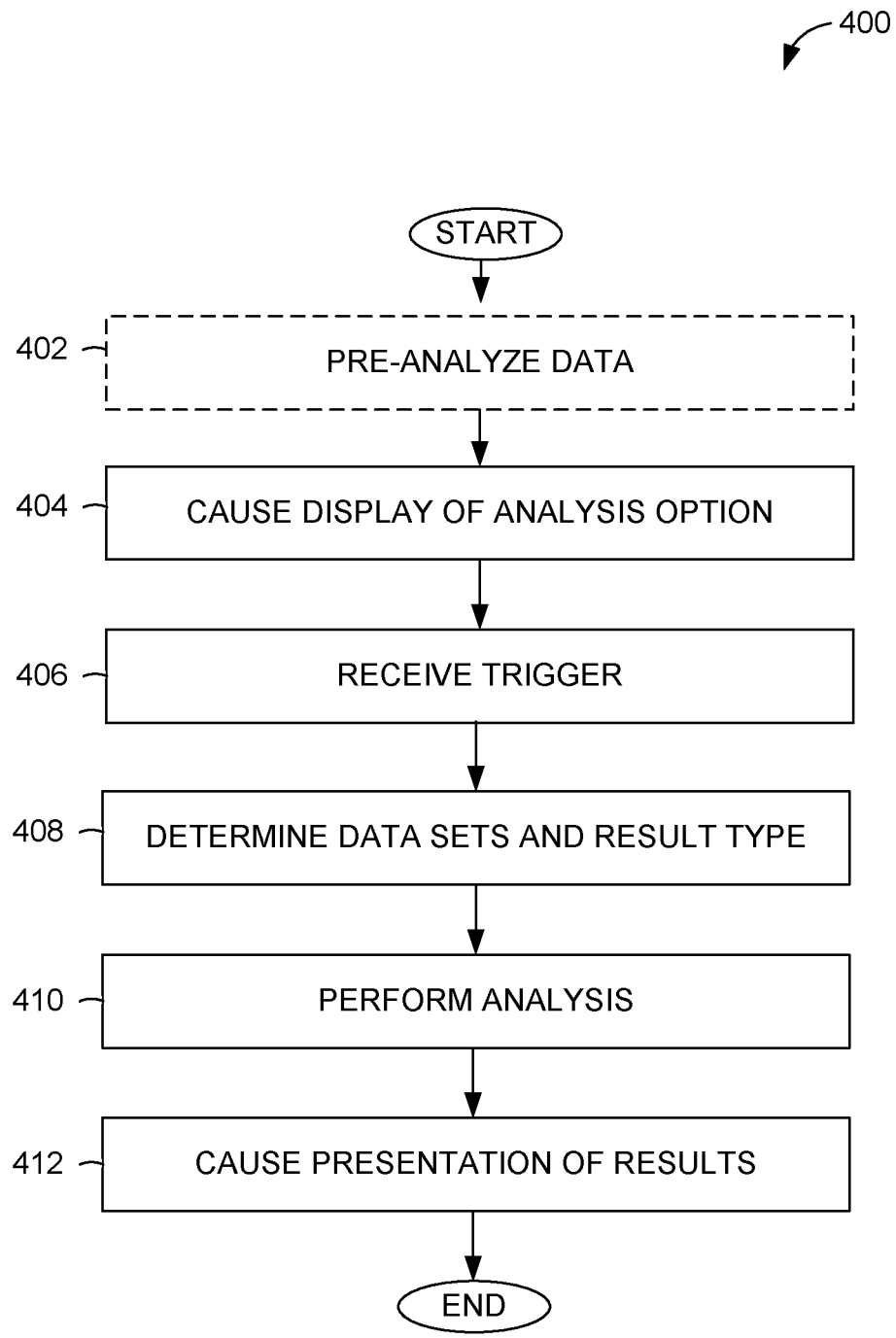
FIG. 4 is a flow diagram of an example method for providing analytics and data visualization of the attached file.

FIG. 4 is a flow diagram of an example method 400 for providing analytics and data visualization for a file attachment. Operations in the method 400 may be performed, in part, by the analysis system 108, using components (e.g., modules, engines) described above with respect to FIG. 2. Accordingly, the method 400 is described by way of example with reference, in part, to the analysis system 108. However, it shall be appreciated that at least some of the operations of the method 400 may be deployed on various other hardware configurations or be performed by similar components residing elsewhere. Therefore, the method 400 is not intended to be limited to the analysis system 108. The analysis system 108 may be located at the server 102 or at the client device 114, or different components of the analysis system 108 located at the server 102 and client device 114.

In operation 402, data from the attached file is pre-analyzed prior to a user accessing the corresponding main data. (e.g., before the e-mail communication is viewed by the user). In example embodiments, the pre-analysis engine 106 at the server 102 detects that the main data has an attached file, and, in some embodiments, determines that a computation is likely to occur (e.g., based on user preferences or default settings). In these embodiments, the pre-analysis engine 106 performs pre-analysis on data from the attached file and stores the pre-analyzed data in the data storage 110. For example, the pre-analysis may calculate a summation value, an average value, a median value, a minimum value, or a maximum value. The type of pre-analysis performed may be based on user preferences or default setting in accordance with some embodiments. In various embodiments, operation 402 is optional.

The remainder of the method 400 assumes that an attachment-enabled application 116 is running on the client device 114. Each of the subsequent operations is performed without the user explicitly downloading the attached file to their desktop, and may be performed while the user remains in the attachment-enabled application (e.g., a main display on the client device 114 shows the attachment-enabled application running) and is displaying main data (e.g., an e-mail communication or a calendar entry).

In operation 404, an analysis option for a file attached to the main data is presented (or caused to be presented). In example embodiments, the data access module 202 receives an indication that the user may be interested in analyzing a file attached to the main data that is being accessed (e.g., displayed) on the client device 114. For example, while viewing the main data in the attachment-enabled application 116, the user hovers (e.g., mouse-over) or right clicks on an icon or link representing the attached file. In response, the data access module 202 determines whether the attached file can be analyzed. In some embodiments, the data access module 202 accesses data corresponding to the attached file and determines whether the data is delimited or is data of a particular type (e.g., .csv file). Alternatively, the attached file may contain data explicitly indicating that analysis can be, or should be, performed on it (e.g., an indication provided in a header or first line of the attached file). In some embodiments, the data comprises the pre-analyzed data from operation 402. It is noted that, the data access module 202 may, in some cases, only access a portion of the values from the attached file (e.g., enough to determine that the attached file can be analyzed). Further still, user default settings may be accessed by the data access module 202 that indicate whether certain types of files (e.g., .csv files) or files from certain entities should be analyzed. Based on a determination that the file can be analyzed, the analysis option is presented (e.g., in a menu of options).

In operation 406, a trigger to perform analysis on the attached file is received by the trigger module 204. In example embodiments, the trigger module 204 monitors for an indication of the selection of the analysis option presented in operation 404. If the user selects the analysis option (e.g., presented on the menu), the indication is received by the trigger module 204. Upon receiving the indication, the trigger module 204 instructs one or more of the other components of the analysis system 108 to perform their respective functions.

In operation 408, the preview module 206 determines one or more data sets and an output result type for the analysis. The determination is based on the data corresponding to the attached file (e.g., data in the attached file, pre-analyzed data for the attached file, default settings related to the attached file). In embodiments where the data access module 202 only accesses a portion of the values from the attached file (e.g., enough to determine that the attached file can be analyzed) in operation 404, the data access module 202 may now access the remainder of the values. Operation 408 will be discussed in more detail in connection with FIG. 5 below.

In operation 410, the processing module 208 perform the analysis on the selected data sets and generates a result (e.g., a visualization) in the indicated result type. Based on the selected data set(s) and the result type, the processing module may perform calculations (e.g., summation, average, median, maximum, and minimum), generate graphs (e.g., plots or charts), or perform a combination of both.

In operation 412, the result (e.g., visualization) is caused to be presented on the client device 114. In example embodiments, the processing module 208 provides the result (e.g., transmits instructions and the result) to the UI module 118, which then causes display of the results on the client device 114.

Figure 5:
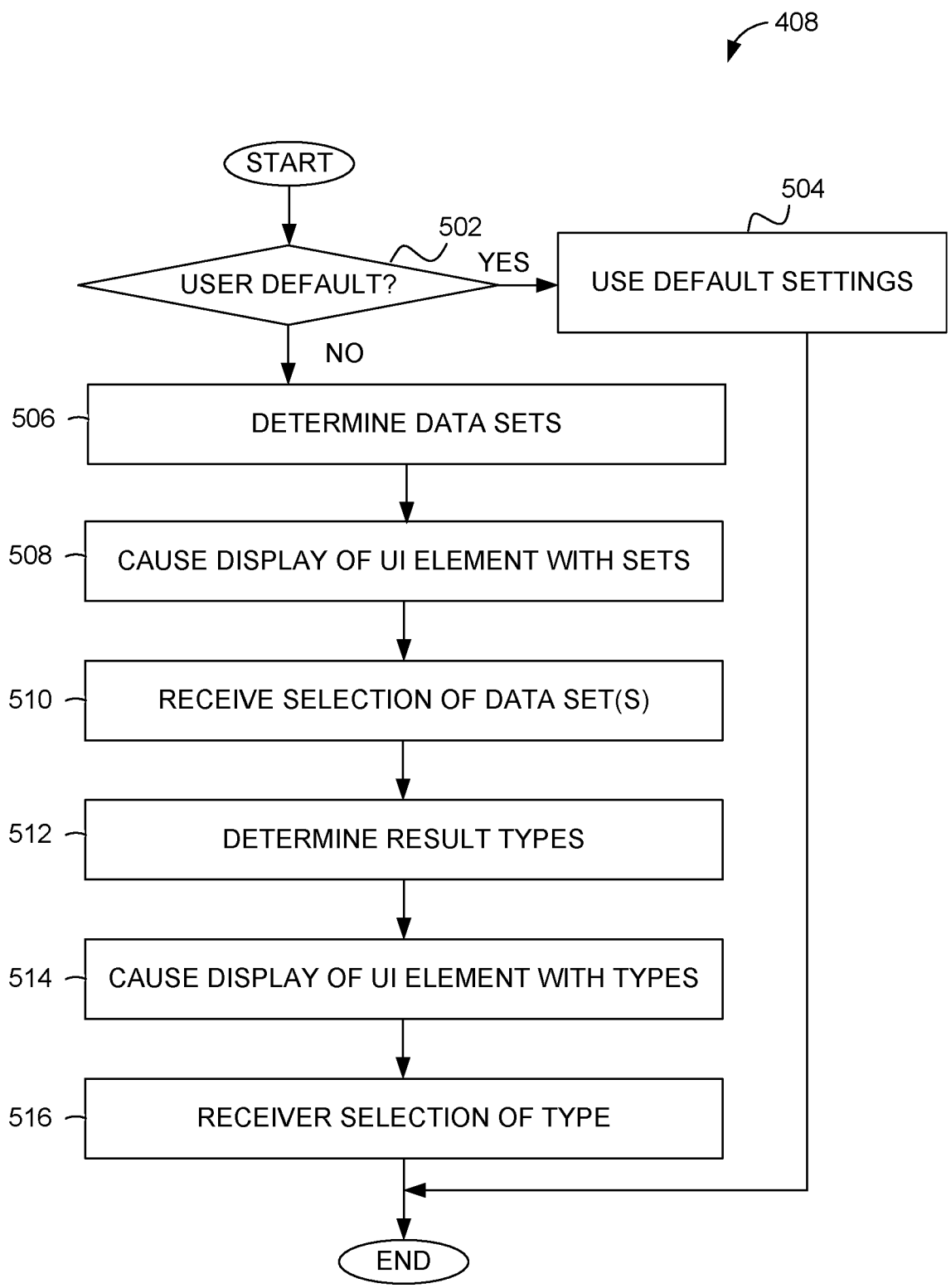
FIG. 5 is a flow diagram of an example method for determining data sets and result type to use in generating a result.

FIG. 5 is a flow diagram of a method (e.g., detail operations of operation 408) for determining the data sets and the result type to use in generating the result in accordance with example embodiments. Operations in the method may be performed by the analysis system 108, using components (e.g., modules, engines) described above with respect to FIG. 2. Accordingly, the method is described by way of example with reference to the analysis system 108. However, it shall be appreciated that at least some of the operations of the method may be deployed on various other hardware configurations or be performed by similar components residing elsewhere. Therefore, the method is not intended to be limited to the analysis system 108. The analysis system 108 may be located at the server 102 or at the client device 114, or different components of the analysis system 108 located at the server 102 and client device 114.

In operation 502, a determination is made as to whether user default settings indicate the data set(s) and result type to be used in analyzing the attached file. In example embodiments, the preview module 206 (e.g. via the data access module 202) accesses, from a data storage, user default settings established by the user for analysis of attached files in the attachment-enabled application. The preview module 206 then determines whether the user default settings are applicable to the attached file. For example, the user default settings may indicate that .cvs files from a particular department should be analyzed, that the analysis should be performed on a first and third data set from the .cvs file, and that the result type should be a bar graph. Therefore, if the current attached file is a .cvs file from the indicated department, then in operation 504, these user default settings for the data set(s) and result type are identified for use in the analysis process. Thus, for the example, the analysis will be performed on the first and third data set from the .cvs file and the result type will be a bar graph.

If there are no default settings or the default settings do not apply to the attached file, then in operation 506, the preview module 206 determines sample data sets to be presented to the user. The data from the attached files may contain headers, columns, and rows of data. The preview module 206 organizes a portion of the data into sample data sets based on the headers, columns, and rows and generates a user interface (UI) element.

The UI element is caused to be displayed on the client device 114 in operation 508. In example embodiments, the preview module 206 provides the UI element (e.g., transmits instructions to display the UI element) to the user interface module 118 of the client device 114. The UI element comprises a preview of sample data sets that may be analyzed along with selectable components (e.g., checkboxes) that allow the user to select one or more data sets to be analyzed.

In operation 510, the preview module 206 receives a selection of one or more data sets to be analyzed. Based on the selected one or more data sets, the preview module 206 identifies a plurality of result types that are applicable to the selected one or more data sets in operation 512. The plurality of result types comprises different plots/graphs or basic calculations that can be performed on the selected one or more data sets. For example, if only a single data set is selected for analysis, the preview module 206 may determine that the result types available include basic calculations (e.g., a summation, an average, a median, a minimum, or a maximum). In contrast, if two data sets are selected for analysis, the preview module 206 may determine that plots/graphs (e.g., bar graph, line graph, pie chart, scatter graph) or other types of two-dimensional data displays are also available as result types. For a selection of three data sets, the preview module 206 may determine that a combination of basic calculations and plots/graphs are available as result types (e.g., graph of summation or average values).

Based on the identification of the applicable result types, the preview module 206 generates a second user interface (UI) element that is causes to be displayed in operation 514. In example embodiments, the preview module 206 provides the second UT element (e.g., transmits instructions to display the UI element) to the user interface module 118 of the client device 114. The second UI element comprises a preview of the different result types, whereby each of the result types is selectable by the user. In operation 516, the preview module 516 receives the selection of the result type.

In some embodiments, the analysis process is included for free with the attachment-enabled application. In other embodiments, the user subscribes to a service that provides the analysis process (e.g., full subscription, per usage subscription). Further still, the attachment-enabled application may provide an in-application purchase option (e.g., over certain time and/or datasets, pay per use) for analysis of the attached file.

Figure 6:
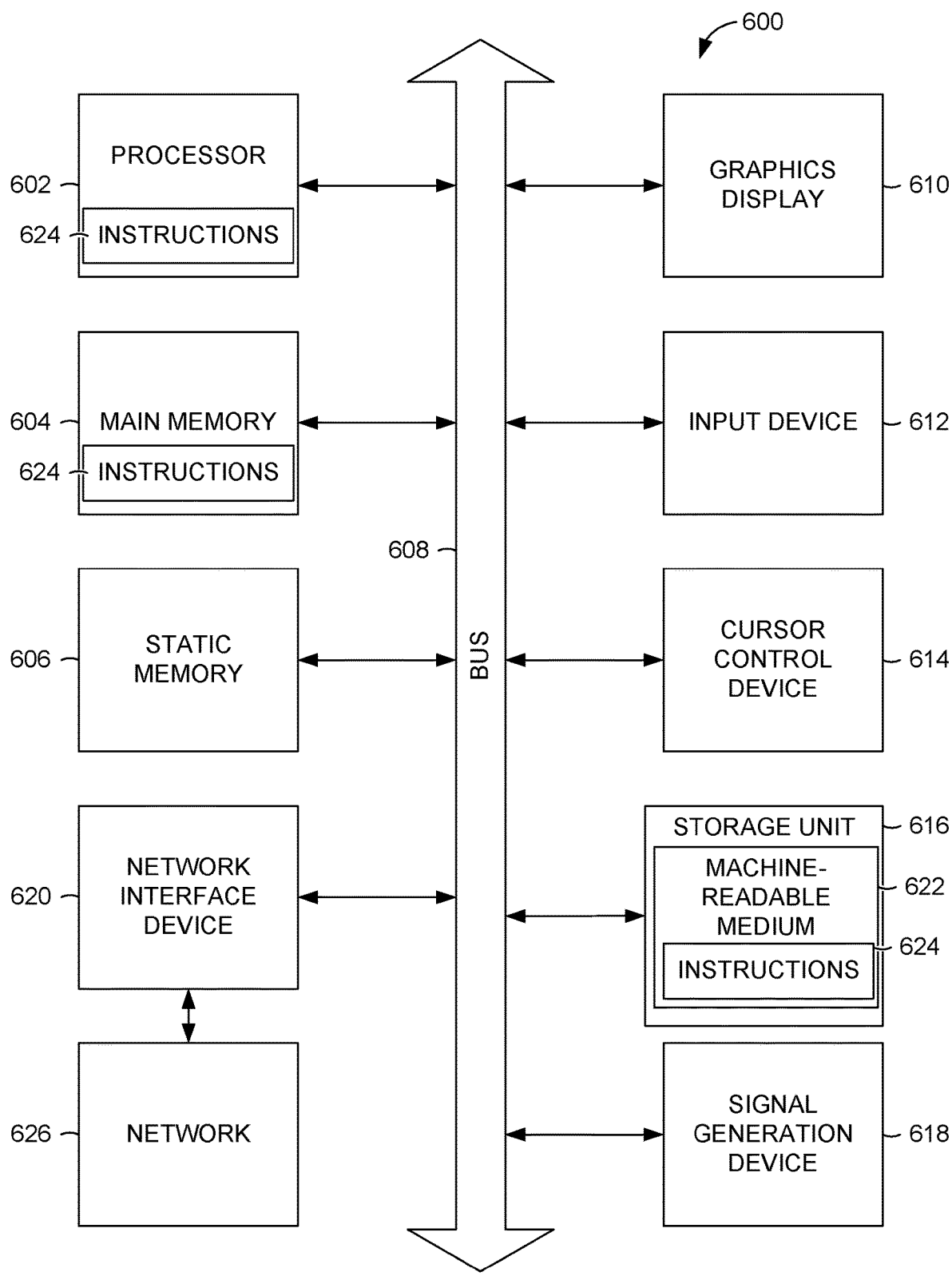
FIG. 6 is a diagrammatic representation of a machine in an example form of a computing system within which a set of instructions may be executed for causing the machine to perform any one or more of the methodologies discussed herein, according to an example embodiment.

FIG. 6 is a block diagram illustrating components of a machine 600, according to some example embodiments, able to read instructions 624 from a machine-storage medium 622 and perform any one or more of the methodologies discussed herein, in whole or in part. Specifically, FIG. 6 shows the machine 600 in the example form of a computer device (e.g., a computer) within which the instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flows and flow diagrams of FIGS. 3-5. The instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. The machine 600 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 600 capable of executing the instructions 624, sequentially or otherwise, that specify actions to be taken by that machine 600. Further, while only a single machine 600 is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, a signal generation device 618 (e.g., a sound card, an amplifier, a speaker, a headphone jack, or any suitable combination thereof), and a network interface device 620.

The storage unit 616 includes the machine-storage medium 622 on which are stored the instructions 624 embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-storage media 622 (e.g., tangible and non-transitory machine-readable media).

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" or "signal medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 622 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 602 or a group of processors 602) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a system for providing analytics and data visualization of an attached file in an attachment-enabled application. The system includes one or more processors and a memory storing instructions that, when executed by the one or more hardware processors, causes the one or more hardware processors to perform operations comprising causing presentation of an option to perform analysis on a file attached to main data in an attachment-enabled application; receiving an indication of a selection of the option to perform the analysis on the attached file, the analysis to be performed without user download of the attached file; determining, based on data corresponding to the attached file, one or more data sets on which to perform the analysis and a result type for outputting of a result; in response to the determining of the one or more data sets and the result type, performing analysis on the one or more data sets to generate the result based on the result type; and causing presentation of the result based on the result type.

In example 2, the subject matter of example 1 can optionally include wherein the attachment-enabled application is an e-mail application and the main data comprises an e-mail communication.

In example 3, the subject matter of examples 1-2 can optionally include wherein the attachment-enabled application is a calendar application and the main data comprises calendar event data.

In example 4, the subject matter of examples 1-3 can optionally include wherein the determining the one or more data sets comprises causing presentation of a first user interface element in the attachment-enabled application, the first user interface element providing sample data sets from the data corresponding to the attached file and having selectable components for selection of the one or more data sets to be analyzed; and receiving a selection of the one or more data sets.

In example 5, the subject matter of examples 1-4 can optionally include wherein the determining the result type for outputting of the result comprises, based on the selection of the one or more data sets, identifying a plurality of result types that are applicable to the one or more data sets; causing presentation of a second user interface element displaying the plurality of result types; and receiving a selection of the result type from the plurality of result types.

In example 6, the subject matter of examples 1-5 can optionally include wherein the plurality of applicable result types comprises different graphs, a summation value, an average value, a median value, a minimum value, or a maximum value.

In example 7, the subject matter of examples 1-6 can optionally include wherein the operations further comprise providing a back option, selection of the back option allowing the user to indicate a different selection of a data set or a different selection of a result type, the different selection causing the analysis to be re-performed.

In example 8, the subject matter of examples 1-7 can optionally include wherein the determining the one or more data sets on which to perform the analysis and the result type for outputting of the result comprises accessing user default settings established for analysis of attached files in the attachment-enabled application; determining whether the user default settings are applicable to the attached file; and based on the user default settings being applicable, using the user default settings to determine the one or more data sets and the result type In example 9, the subject matter of examples 1-8 can optionally include wherein the data corresponding to the attached file comprises pre-analyzed data, the pre-analyzed data comprising data from the attached file that has been processed, by a server, prior to the causing presentation of the option.

In example 10, the subject matter of examples 1-9 can optionally include wherein the attached file is attached to main data via a data link displayed within the main data.

Example 11 is a method for providing analytics and data visualization of an attached file in an attachment-enabled application. The method comprises causing presentation of an option to perform analysis on a file attached to main data in an attachment-enabled application; receiving, by a trigger module, an indication of a selection of the option to perform the analysis on the attached file, the analysis to be performed without user download of the attached file; determining, by a preview module using data corresponding to the attached file, one or more data sets on which to perform the analysis and a result type for outputting of a result; in response to the determining of the one or more data sets and the result type, performing, by one or more hardware processors, analysis on the one or more data sets to generate the result based on the result type; and causing presentation of the result of the analysis based on the result type.

In example 12, the subject matter of example 11 can optionally include wherein the determining the one or more data sets comprises causing presentation of a first user interface element in the attachment-enabled application, the first user interface element providing sample data sets from the data corresponding to the attached file and having selectable components for selection of the one or more data sets to be analyzed; and receiving a selection of the one or more data sets.

In example 13, the subject matter of examples 11-12 can optionally include wherein the determining the result type for outputting of the result comprises, based on the selection of the one or more data sets, identifying a plurality of result types that are applicable to the one or more data sets; causing presentation of a second user interface element displaying the plurality of result types; and receiving a selection of the result type from the plurality of result types.

In example 14, the subject matter of examples 11-13 can optionally include providing a back option, selection of the back option allowing the user to indicate a different selection of a data set or a different selection of a result type, the different selection causing the analysis to be re-performed.

In example 15, the subject matter of examples 11-14 can optionally include wherein the determining the one or more data sets on which to perform the analysis and the result type for outputting of the result comprises accessing user default settings established for analysis of attached files in the attachment-enabled application; determining whether the user default settings are applicable to the attached file; and based on the user default settings being applicable, using the user default settings to determine the one or more data sets and the result type.

In example 16, the subject matter of examples 11-15 can optionally include wherein the data corresponding to the attached file comprises pre-analyzed data, the pre-analyzed data comprising data from the attached file that has been processed, by a server, prior to the causing presentation of the option.

In example 17, the subject matter of examples 11-16 can optionally include wherein the attached file is attached to main data via a data link displayed within the main data.

Example 18 is a machine-storage medium for providing analytics and data visualization of an attached file in an attachment-enabled application. The machine-storage medium configures one or more processors to perform operations comprising causing presentation of an option to perform analysis on a file attached to main data in an attachment-enabled application; receiving an indication of a selection of the option to perform the analysis on the attached file, the analysis to be performed without user download of the attached file; determining, based on data corresponding to the attached file, one or more data sets on which to perform the analysis and a result type for outputting of a result; in response to the determining of the one or more data sets and the result type, performing analysis on the one or more data sets to generate the result based on the result type; and causing presentation of the result of the analysis based on the result type.

In example 19, the subject matter of example 18 can optionally include wherein the determining the one or more data sets comprises causing presentation of a first user interface element in the attachment-enabled application, the first user interface element providing sample data sets from the data corresponding to the attached file and having selectable components for selection of the one or more data sets to be analyzed; and receiving a selection of the one or more data sets.

In example 20, the subject matter of examples 18-19 can optionally include wherein the determining the result type for outputting of the result comprises, based on the selection of the one or more data sets, identifying a plurality of result types that are applicable to the one or more data sets; causing presentation of a second user interface element displaying the plurality of result types; and receiving a selection of the result type from the plurality of result types Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
one or more hardware processors; and
a memory storing instructions that, when executed by the one or more hardware processors, cause the one or more hardware processors to perform operations comprising:
causing presentation of a user interface of an attachment-enable application that displays main data and a representation of an attached file;
in response to a hover or right-click action on the representation of the attached file, causing presentation of an option to perform analysis on the attached file;
receiving an indication of a selection of the option to perform the analysis on the attached file, the analysis to be performed without user download of the attached file;
in response to receiving the selection of the option, causing presentation of a first user interface element overlaid over the main data and positioned relative to the representation of the attached file on the user interface, the first user interface element providing a preview of sample data sets from data corresponding to the attached file and having selectable components for selection of the one or more data sets to be analyzed;
receiving a selection of the one or more data sets via the first user interface element;
in response to receiving the selection of the one or more data sets, determining one or more result types for outputting a result of the analysis, the analysis and the one or more result types for outputting the result being determined based on a number of selected data sets;
presenting, on the user interface, the one or more result types determined based on the number of selected data sets, the presenting the one or more result types comprises causing presentation of a second user interface element overlaid over the main data and positioned relative to the first user interface element on the user interface that graphically presents a preview of the one or more result types that are applicable to the one or more data sets;
in response to receiving a selection of a result type from the presented one or more result types, performing the analysis on the selected one or more data sets to generate the result in the result type without user download of the attached file; and
causing presentation of the result in a result user interface element that is a popover displayed over the main data and positioned relative to the representation of the attached file in the user interface, the popover replacing the first user interface element and the second user interface element in the user interface.

2. The system of claim 1, wherein the attachment-enabled application is an e-mail application and the main data comprises an e-mail communication.

3. The system of claim 1, wherein the attachment-enabled application is a calendar application and the main data comprises calendar event data.

4. The system of claim 1, wherein the one or more result types comprises different graphs, a summation value, an average value, a median value, a minimum value, or a maximum value.

5. The system of claim 1, wherein the operations further comprise providing a back option, selection of the back option allowing the user to indicate a different selection of a data set or a different selection of a result type, the different selection causing the analysis to be re-performed.

6. The system of claim 1, wherein the determining the one or more result types comprises:
accessing user default settings established for analysis of attached files in the attachment-enabled application;
determining whether the user default settings are applicable to the attached file; and
based on the user default settings being applicable, using the user default settings to determine the one or more result types for outputting of the result.

7. The system of claim 1, wherein the data corresponding to the attached file comprises pre-analyzed data, the pre-analyzed data comprising data from the attached file that has been processed, by a server, prior to the causing presentation of the option.

8. The system of claim 1, wherein the representation of the attached file comprises a data link displayed within the main data.

9. The method of claim 1, wherein the selection of a single data set causes a basic calculation to be performed as the analysis, the basic calculation including one or more of a summation, an average, a median, a maximum, or a minimum.

10. The method of claim 1, wherein the selection of two data sets causes a two-dimensional graph generation process to be performed as the analysis, the one or more result types including two-dimensional graph types.

11. The method of claim 1, wherein the selection of at least three data sets causes a combination of a basic calculation and a two-dimensional graph generation process to be performed as the analysis, the one or more result types including two-dimensional graph types showing the result of the basic calculation, the basic calculation including one or more of a summation, an average, a median, a maximum, or a minimum.

12. A method comprising:
causing presentation of a user interface of an attachment-enable application that displays main data and a representation of an attached file;
in response to a hover or right-click action on the representation of the attached file, causing presentation of an option to perform analysis on the attached file;
receiving, by a trigger module, an indication of a selection of the option to perform the analysis on the attached file, the analysis to be performed without user download of the attached file;
in response to receiving the selection of the option, causing presentation of a first user interface element overlaid over the main data and positioned relative to the representation of the attached file on the user interface, the first user interface element providing a preview of sample data sets from data corresponding to the attached file and having selectable components for selection of the one or more data sets to be analyzed;
receiving a selection of the one or more data sets via the first user interface element;
in response to receiving the selection of the one or more data sets, determining one or more result types for outputting a result of the analysis, the analysis and the one or more result types for outputting the result being determined based on a number of selected data sets;
presenting, on the user interface, the one or more result types determined based on the number of selected data sets, the presenting the one or more result types comprises causing presentation of a second user interface element overlaid over the main data and positioned relative to the first user interface element on the user interface that graphically presents a preview of the one or more result types that are applicable to the one or more data sets;

in response to receiving a selection of a result type from the presented one or more result types, performing, by one or more hardware processors, the analysis on the selected one or more data sets to generate the result in the result type without user download of the attached file; and causing presentation of the result in a result user interface element that is a popover displayed over the main data and positioned relative to the representation of the attached file in the user interface, the popover replacing the first user interface element and the second user interface element in the user interface.

13. The method of claim 12, further comprising providing a back option, selection of the back option allowing the user to indicate a different selection of a data set or a different selection of a result type, the different selection causing the analysis to be re-performed.

14. The method of claim 12, wherein the determining the one or more result types comprises:

accessing user default settings established for analysis of attached files in the attachment-enabled application;

determining whether the user default settings are applicable to the attached file; and based on the user default settings being applicable, using the user default settings to determine the one or more result types for outputting of the result.

15. The method of claim 12, wherein the data corresponding to the attached file comprises pre-analyzed data, the pre-analyzed data comprising data from the attached file that has been processed, by a server, prior to the causing presentation of the option.

16. The method of claim 12, wherein the representation of the attached file comprises a data link displayed within the main data.

17. A non-transitory machine-storage medium storing instructions that, when executed by one or more processors of a machine, cause the one or more processors to perform operations comprising:

causing presentation of a user interface of an attachment-enable application that displays main data and a representation of an attached file;

in response to a hover or right-click action on the representation of the attached file, causing presentation of an option to perform analysis on the attached file;

receiving an indication of a selection of the option to perform the analysis on the attached file, the analysis to be performed without user download of the attached file;

in response to receiving the selection of the option, causing presentation of a first user interface element overlaid over the main data and positioned relative to the representation of the attached file on the user interface, the first user interface element providing a preview of sample data sets from data corresponding to the attached file and having selectable components for selection of the one or more data sets to be analyzed;

receiving a selection of the one or more data sets via the first user interface element;

in response to receiving the selection of the one or more data sets, determining one or more result types for outputting a result of the analysis, the analysis and the one or more result types for outputting the result being determined based on a number of selected data sets;

presenting, on the user interface, the one or more result types determined based on the number of selected data sets, the presenting the one or more result types comprises causing presentation of a second user interface element overlaid over the main data and positioned relative to the first user interface element on the user interface that graphically presents a preview of the one or more result types that are applicable to the one or more data sets;

in response to receiving a selection of a result type from the presented one or more result types, performing the analysis on the selected one or more data sets to generate the result in the result type without user download of the attached file; and causing presentation of the result in a result user interface element that is a popover displayed over the main data and positioned relative to the representation of the attached file in the user interface, the popover replacing the first user interface element and the second user interface element in the user interface.

* * * * *